United States Patent [19]

Luecking et al.

[11] Patent Number: 4,611,734

[45] Date of Patent: Sep. 16, 1986

[54] MOBILE PHONE MOUNTING

[76] Inventors: R. Kent Luecking, 3507A Shenandoa, St. Louis, Mo. 63104; James E. Cravens, 927 Pontoison Dr., St. Louis, Mo. 63011

[21] Appl. No.: 622,101

[22] Filed: Jun. 19, 1984

[51] Int. Cl.$^4$ ................................................ B60R 7/00
[52] U.S. Cl. .............................. 224/42.42; 224/42.44; 108/44; 297/162
[58] Field of Search .................. 108/48, 115, 134, 44; 297/162; 224/42.42, 42.45 R, 42.43, 42.44, 275, 273

[56] References Cited

U.S. PATENT DOCUMENTS

| | | | |
|---|---|---|---|
| 2,391,861 | 1/1946 | Bellows | 108/115 |
| 2,843,436 | 7/1958 | Franks | 108/134 |
| 3,685,708 | 8/1972 | Herrington | 224/42.42 |
| 3,727,813 | 4/1973 | Eby | 224/42.42 |
| 3,964,612 | 6/1976 | Skilliter et al. | 224/42.42 |
| 3,968,992 | 7/1976 | Hogan | 297/162 |
| 4,097,012 | 6/1978 | McIntyre | 224/42.42 |

Primary Examiner—Stephen Marcus
Assistant Examiner—David Voorhees
Attorney, Agent, or Firm—Kalish & Gilster

[57] ABSTRACT

A mounting for a mobile phone for usage in a vehicle having spaced-apart, discrete front seats, or so-called "bucket seats" comprising linkage having the lower end thereof secured within the spacing intervening the seats or to a console should such be interposed therein, and with the other, upper end of the linkage secured to an arm; there being a phone support of plate character and being adapted for area adjustability hingedly mounted on the arm for movement between operative, horizontal disposition overlyingly of the aforesaid spacing, or console, as the case may be, and inoperative, vertical disposition laterally of the same.

16 Claims, 12 Drawing Figures

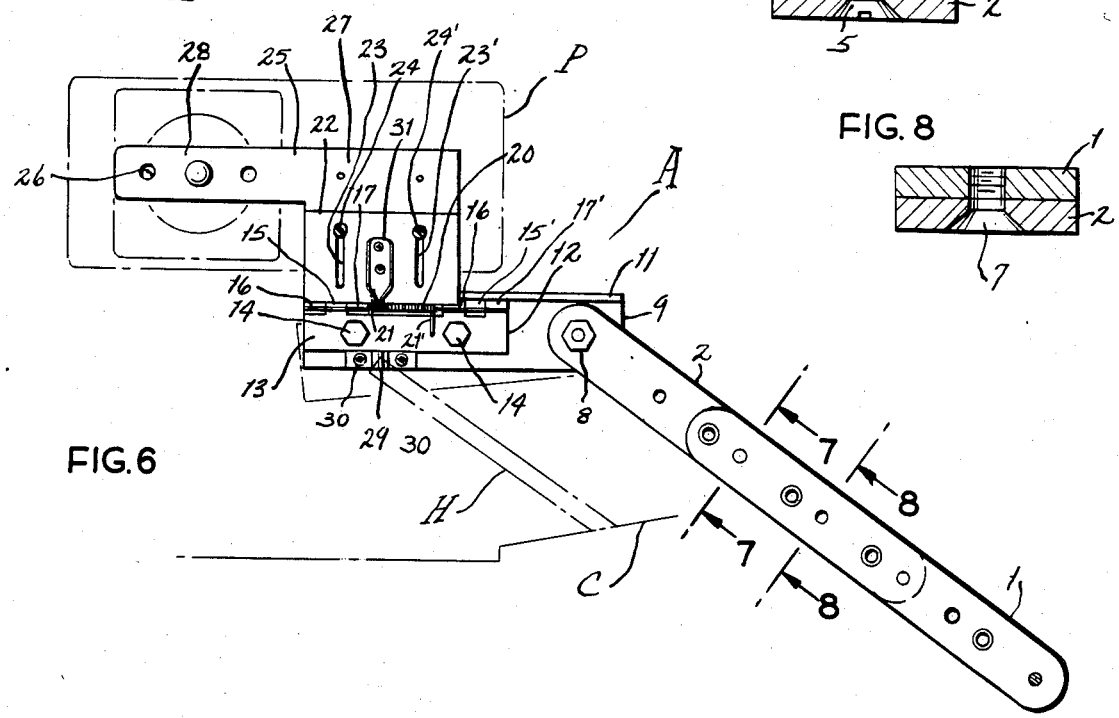

MOBILE PHONE MOUNTING

BACKGROUND AND SUMMARY OF THE INVENTION

This invention relates in general to mobile phones and, more particularly, vehicular mountings therefor.

Heretofore, mobile phones, more generally known as car-phones, have been mounted within the related vehicles by substantially but two expedients. One such mounting is of the pedestal type which requires bolting directly to the so-called floor hump of the vehicle and which mounting accordingly constitutes an independent structure intruding upon the limited volume within the front seat area of the vehicle; the other mounting system has been commonly referred to as the duck-bill type in that it necessitates securement to a relatively enlarged flat surface. Mountings of the aforesaid types have had general usage in vehicles incorporating a bench-type front seat.

However, with the advent and ensuing widespread usage and popularity of vehicle front seats embodying a discrete driver's seat and a passenger's seat with a spacing or volume therebetween, the disposition of a mobile phone in such vehicles has been difficult since such spacing will normally contain the emergency or handbrake and, thus, render the space seemingly unavailable for phone mountings as of the type heretofore utilized.

Such spacing may also, in most instances, accommodate a console which might be of varying character. Thus, the same may be relatively short in length, adequate for accepting the handbrake alone, or may be relatively extensive so as to progress forwardly beyond the front edge of the front seats for integration with the dashboard and thereby provide a suitable housing for not just the handbrake, but for control push buttons, gearshift, etc. Accordingly, the so-called "bucket seat" arrangement has occasioned problems in supporting mobile telephones since the customary spacing has been severely impinged upon by the strctural alterations concomitant with such seat arrangements.

Therefore, it is an object of the present invention to provide mountings for a mobile phone in automotive vehicles incorporating a pair of spaced-apart front seats.

It is another object of the present invention to provide mountings for mobile phones for vehicles of the type stated which uniquely embody a paucity of components which are sturdy so that longevity and hard usage are assured.

It is a further object of the present invention to provide mobile phone mountings of the character stated which embody mutually adjustable constituent elements so as to readily and comfortably coordinate with the particular spacing or volume between the front, or bucket, seats so that the effective utilization of said spacing is undiminished.

It is a still further object of the present invention to provide mountings of the character stated within vehicles of the style described, which mountings comprise components uniquely adapted to present the supported mobile phone for facile, effective usage and also for easy swingability from a position which might cause interference with operation of devices or access to things within the invertening spacing, together with reliability of return to operative position.

It is a still further object of the present invention to provide mountings of the character stated which may be most economically manufactured; which are especially amenable to availability in knock-down state; which may be easily assembled and secured into selected operative position within the vehicle by the average automobile owner; and which are durable and wholly reliable in usage.

It is another object of the present invention to provide mountings for mobile phones in vehicles of the style above-described which require a minimum of space so that inconvenience and discomfort is not occasioned the passengers, and which is peculiarly adapted for such vehicles which incorporate center consoles of any predetermined size or length.

The present invention essentially comprises a plurality of elongated arms or links, as formed of metal, and which are suitably apertured for selected interengagement for jointly presenting a mobile phone at a desired point of elevation; there being a phone support plate engageable at the upper end of the uppermost link for securement to the particular mobile phone. The said links may be of varying length so as to provide a marked range of adjustability. The lower end of the lowermost link may be secured by various means within the spacing between the seats, such as, for instance, upon the seat belt bolt, the seat rail bolt by an independent, floor-secured bracket, or directly to the so-called "hump" which constitutes a housing for the propeller shaft. It will be shown hereinbelow that such novel mounting does not invade the leg-receiving area of the passengers and obviates any inconvenience.

BRIEF DESCRIPTION OF THE DRAWINGS

FIG. 4 is a front view as taken from the right hand side of FIG. 2 and illustrating the mobile phone support plate in inoperative, swung position in phantom lines.

FIG. 5 is a fragmentary bottom view taken on the line 5—5 of FIG. 4.

FIG. 6 is a side elevational view as taken from the opposite side of FIG. 2, but illustrating the mobile phone support in inoperative position.

FIG. 7 is a vertical transverse sectional view taken on the line 7—7 of FIG. 6.

FIG. 8 is a vertical transverse sectional view taken on the line 8—8 of FIG. 6.

Corresponding reference characters indicate corresponding parts throughout the several views of the drawings.

DESCRIPTION OF PRACTICAL EMBODIMENTS

Figure 1:
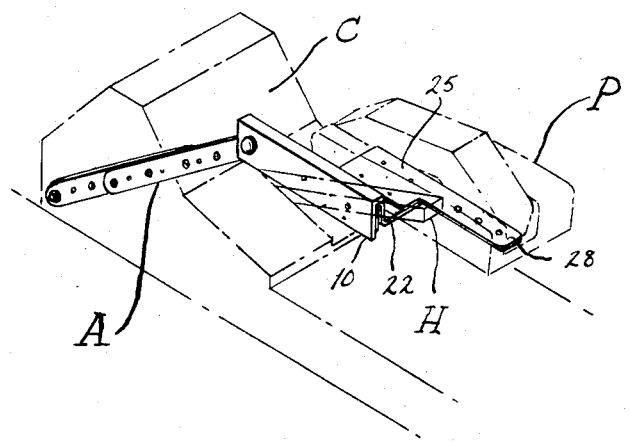
FIG. 1 is a perspective view of a mobile phone mounting constructed in accordance with, and embodying the present invention, illustrating same as secured in full operative position within a vehicle having a pair of spaced-apart front seats with an intervening console.

The motivation for the present invention is to provide a suitable mobile phone mounting structure which is especially adapted for installation in autmotive vehicles of the type or style wherein there are independent, separated front seats for a driver and a passenger; the same being colloquially referred to as "bucket seats" and, thus, are readily distinguishable from the heretofore common bench seat of continuous, unbroken character from side to side of the vehicle. The mountings of the present invention are designed for disposition within the volume or spacing between the discrete front or bucket seats and are so uniquely constructed as to be adapted for avoiding interference with any instrumentality of the vehicle located within such spacing or to hinder accessibility to such spacing should it be utilized for article storage purposes as well.

Thus, the present invention is not to be construed as designed primarily for accommodating usage with vehicles having the aforesaid intervening spacing substantially filled by a center console which may be of limited length and merely receiving the emergency or handbrake, or which may be of considerable extent for projecting forwardly and merging into the dashboard. However, since most current vehicles incorporating the so-called "bucket seats" do embody consoles for providing housings for the emergency or handbrake, for control push buttons, and the like, the present invention will be initially described in relationship to a center console containing vehicle, but without any implication that the mobile phone mountings herein disclosed are intended solely for such usage. The center console arrangement is thus described for initial illustrative or exemplary purposes.

Referring now by reference characters to the drawings which illustrate practical embodiments of the present invention, A generally designates a mounting for a mobile or car phone as indicated generally in phantom lines at P. The phone does not form a part of the present invention and is of current general character consisting of a handset housing, a transmitter and receiver, together with a dial of conventional character (none of which components are shown), and being connected to a source of power by the usual cord. C designates a center console providing a housing for the lower end of an emergency handbrake indicated in phantom lines at H, as well as for other customary vehicle operative instruments and article receptacles (not shown). Generally, the lower end of the inner seat belt component for each of the front seats is secured to through the adjacent side of console C, as by means of a seat bolt B which may either progress through a side wall of console C in its associated rearward side for extension into the casing or "hump", as at G, obscured by the console C, or directly to each casing G if the console housing does not project downwardly a sufficient distance (see FIG. 2).

Mounting A comprises a multiplicity of components which are adapted to be mutually secured so as to present mobile phone P at a convenient location overlyingly of the central-forward portion of console C and thus consists of a plurality of flat elongated links or arms which may be of any desired number, but for purposes of illustration are indicated as being but two in the drawings and designated 1, 2. But as indicated, there may be three, four, or more arms i.e. links. However, the arms, regardless of number, should be of different lengths such as in the order of five inches, six inches, nine inches, and twelve inches, with a set of four such arms being thus one of choice. Arm 1 is provided at each of its ends with openings, as at 3, 4; with opening 3 being adapted for extension therethrough of seat belt bolt B for securing said arm 1 rigidly against the adjacent face of console C. Arm 1 is provided throughout its length at varying intervals with a plurality of openings which may be of alternating diameter for securement, as by screws 5, to arm 2 so that the same abut facewise throughout a portion of their length, depending upon the overall extension desired. Arm 2 similarly is provided throughout its length with a plurality of spaced apart openings, as at 6, 7, which are of different diameter so that the same may be aligned with openings of opposite diameter provided on arm 1 in order that screws 5 may be countersunk and, thus, present no obtruding head portions.

From the foregoing it is indeed obvious that the overall length of the combined arms is determined by the particular relationship of the engaged pair of arms, or more as desired, and with the selection of arms having the lengths appropriate for the overall extension sought. It is further apparent that the interconnected arms, i.e., links, together define a linkage means of predetermined overall length for carrying a certain support plate and the mobile phone carried thereon to be presented at a preselected height.

Figure 2:
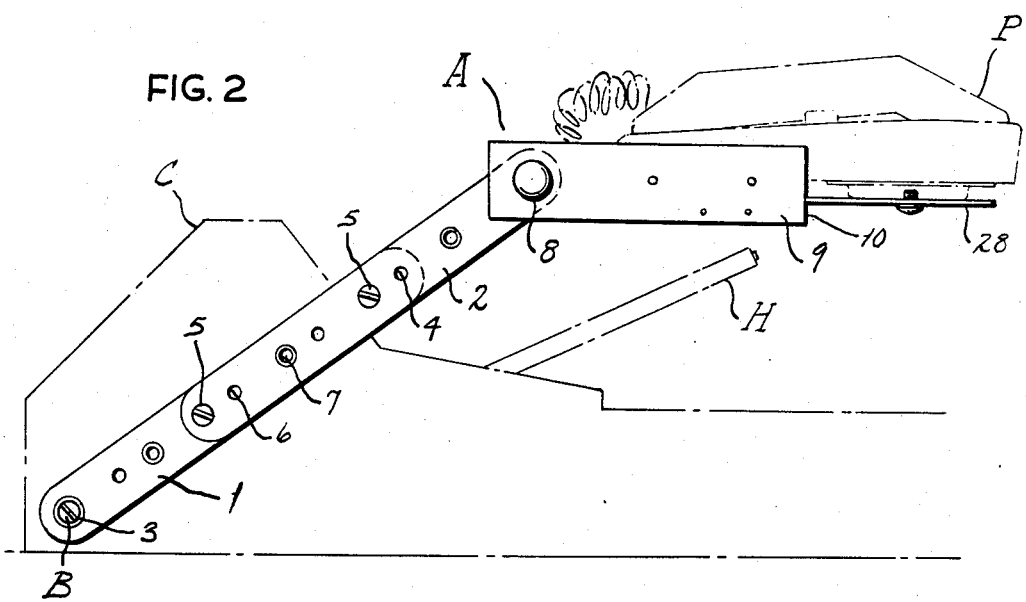
FIG. 2 is a side elevational view of the mounting as illustrated in FIG. 1.

Accordingly, as shown in FIGS. 1 and 2, the interengaged arms 1, 2 are presented at an angle of roughly 45° to the horizontal but manifestly this angle may be varied depending upon the elevation sought for the mobile phone and the particular relationship of the same to the underlying console.

The normally upper end of arm 2 is provided with a suitable opening for receiving a preferably large headed bolt 8 for securement to the normally rearward end of a vertically disposed base plate 9 of a phone support assembly 10. Said base plate 9 at its upper end embodies a short, laterally projecting flange 11, thus endowing plate 9 with an L- or angle-shape and with the forwardly-extending plate serving to provide the function of an arm adjustably clamped by bolt 9 in predetermined angular relationshop with the aforesaid linkage means.

Figure 3:
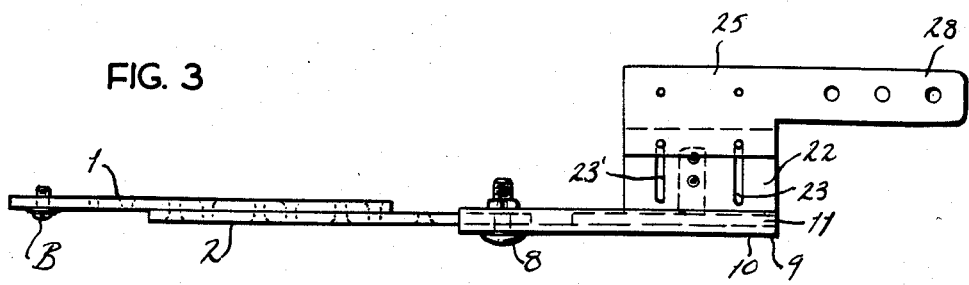
FIG. 3 is a top plan view of the mounting, but in unsecured condition and devoid of a mobile phone.

With reference now being made to FIGS. 3, 4 and 6, it will be seen that a hinge indicated broadly at 12 is mounted upon plate 9; said hinge being of door hinge character comprising a leaf 13 fixedly secured upon the inner face of plate 9 in planar parallel relationship thereto, as by rivets 14; said leaf 13 carrying spaced apart knuckles 15, 15' for disposition intermediate and in axial alignment with companion knuckles 16, 17 and 16', 17', respectively, formed integral with a companion hinge leaf 18; there being the usual pintle 19 projecting through the aligned knuckles for interengaging the leafs 13, 18. Intermediate knuckles 17 and 16' there is provided surroundingly of pintle 19 a coil or piano-type spring 20 having extensions at its opposite ends as at 21, 21' for respective abutment against the adjacent faces of hinge leafs 13, 18. Thus, spring 20 urges leafs 13, 18 away from each other as in the position shown in FIG. 6 and as indicated in phantom lines in FIG. 4. Hinge 18 when in hinge open condition as shown in phantom lines in FIG. 4 will abut against the under surface of flange 11 whereby in such state hinge leafs 13, 18 will be in planar perpendicular relationship.

Hinge leaf 18 at its outer end is continuous with a plate section 22 which is formed at an angle of 90° to hinge leaf 18 so that when the latter is in hinge open condition said plate section 22 will extend vertically upwardly of plate 9 in planar parallel relationship thereto. Said plate section incorporates a pair of spaced apart elongated slot-like openings 23, 23', the axes of which are perpendicular to hinge 18. Said openings 23, 23' accommodate adjustment screws 24, 24' which project therethrough for engagement to a support plate section 25 which is provided with a plurality of spaced apart openings as indicated at 26 for accepting screws or other fastener elements for engaging the base portion of mobile phone P which is thus designed to rest upon said support plate section 25. Accordingly, by suitable loosening of screws 24, 24' support plate section 25 may be moved relative to plate section 22 for facile accommodation of the particular mobile phone supported upon section 25. Although said support section 25 is illustrated as comprising essentially a base area 27 and a narrow elongated extension 28, it is to be understood that the particular configuration of said support section 25 is a matter of choice depending upon the character of the mobile phone and the desired area of support therefor. The configuration of section 25 is simply one configuration which has proved effective and which is of relatively reduced material content. It will accordingly be thus noted that support section 25 and plate section 22 are in planar parallel relationship and designed for relative movement into adjusted positionment of choice.

Mounted upon plate 9 beneath the lower edge of hinge leaf 13 is a male latching element 29 fixedly secured as by screws 30 and presented for locking engagement with a female latching member 31 carried upon the normally underface of plate section 22. It will thus be seen that said female member 31 is provided with resilient jaws as at 32, 32' for gripping of male element 29 when in locked condition; said last-mentioned element having an enlarged head 33 for effecting opening of jaws 32, 32' and with a narrow neck engageable by said jaws. It is, of course, understood that latching elements 29 and 31 are but one expedient for effecting simple but with reliable locking engagement between hinge leafs 13, 18 for securing the same in closed position in order to present plate section 22 together with the engaged support section 25 in horizontal disposition for disposing mobile phone P in operative condition as shown in FIG. 2.

From the foregoing, the operation of the mobile phone mounting of the present invention should be relatively self-evident. The disposition of phone P upwardly of the upper surface of console C is thus determined by the desired mutual adjustment of arms 1, 2 and others as more are required so that plate section 22 and support plate section 25 are presented at a height to render the phone P accessibly convenient to the user. By means of cooperative latching members 29, 31 said support plate section 24 is thus maintained in horizontal disposition as exemplary of the desired angular relationship relative to the floor, and generally as desired by the user. However, should the vehicle operator wish to operate the handbrake H or any other instruments carried upon console C, he need merely lift upwardly upon support plate section 25 with sufficient force so as to effect an unlocking of latch elements 29, 31 whereupon under influence of spring 20 hinge left 18 together with the integrated plate section 22 and the support plate section adjustably mounted thereon will swing upwardly as shown in FIGS. 4 and 6 and thus cause mobile phone P to be swung through an arc of 90° and be effectively disposed laterally of console C; thereby rendering the various components mounted upon console C available for immediate and effective utilization. Thereafter, by return movement, phone P can be restored to horizontal or operative disposition.

Figure 9:
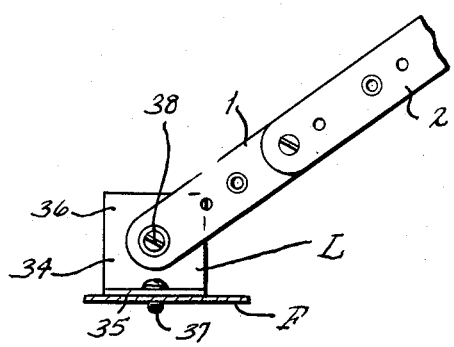
FIG. 9 is a fragmentary side elevational view illustrating another form of support constructed in accordance with and embodying the present invention.
Figure 10:
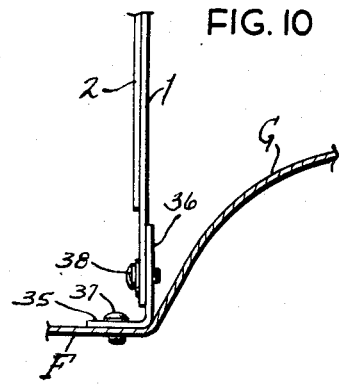
FIG. 10 is a front elevational view as taken at the right hand side of FIG. 9.
Figure 12:
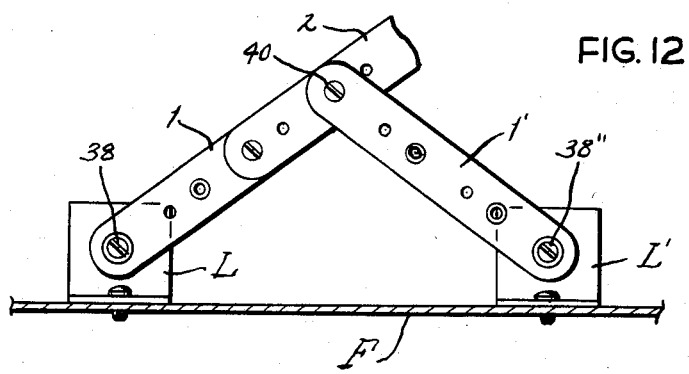
FIG. 12 is a still further form of support constructed in accordance with and embodying the present invention.

Turning now to FIGS. 9 and 10, there is shown another means for securing the mounting of the present invention other than directly upon the console as through means of the seat belt bolt. L designates an angle bracket 34 having horizontal and vertical legs 35, 36. Said horizontal leg 35 may be secured as by fastening member 37 directly upon the floor F of the vehicle and with the lower end of arm 1 of the mounting of the present invention being secured to leg 36 by a screw or bolt 38. By means of angle bracket 34 the mounting of the present invention may be easily disposed within the spacing between the "bucket seats" without respect to whether a center console may be presented. By this manner of disposition, the mounting will present the mobile phone conveniently for ease of usage by the passengers and, yet, be readily swingable into inoperative position to permit facile access to the spacing between the seats for article storage therein or retrieval therefrom. By bracket 34, the mobile phone and its associated components do not in any way intrude upon the area between the bucket seats and the dashboard, and such means are manifestly objectively unobtrusive.

Figure 11:
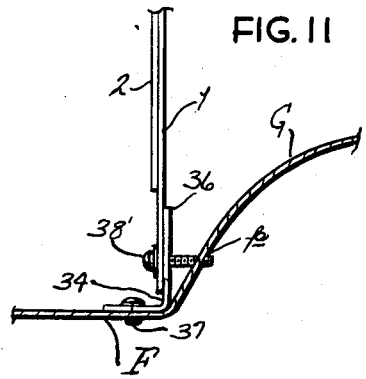
FIG. 11 is a further form of support constructed in accordance with and embodying the present invention.

Referring now to FIG. 11, it will be seen that, if desired, the means of securing the lower end of arm 1 of the mounting of the present invention to vertical leg 36 of bracket 34 may be effected by means of a relatively elongated bolt 38; the head-remote end of which may be threadedly received within the tapped opening p within the adjacent portion of casing or hump G. Thus, by this expedient the rigidity of bracket 34 is enhanced if such may be desired. In this particular context, it will be further noted that the spacing between the seats may or may not have a center console. If such a console is present, then manifestly bolt 38' may engage casing G at a point below the lower edge of the console so that there is no dependence upon the seat belt bolt, or the seat rail bolt.

The mounting of the present invention has been described hereinabove as utilizing a plurality of arms in axially aligned relationship for presenting phone P at the preselected location. However, if desired, the base portion of the phone mounting may be additionally stabilized by using another one of the arms 1' as a brace with the said arm 1' being thus secured to an angle bracket L' located spacedly forwardly of bracket L as by a fastener 38" at the lower end of said arm 1', and with the upper end thereof being secured to the proximate arm 1, 2, as the case may be, as by means of a screw 40 for effecting a rigidification by maintaining the engaged arm 1, 2, as the case may be, against inadvertent forward swinging.

This particular double-bracket system is manifestly not dependent upon whether or not the spacing between the seats incorporates a center console. It is fully useful without a console being present, but has equal usability in conjunction with a console. The fasteners 38, 38" may be such as to effect mere engagement of the related arms 1, 1' to the vertical legs of the respective brackets L, L', or may be extended for engaging casing G in the manner illustrated in FIG. 11. Also, it is quite obvious that if desired brackets L may be engaged to the mounting arms 1 by means of the seat belt bolt. Consequently, the present invention is not dependent upon the presence of a center console, but such relationship has been fully described since it is belived that the preponderant number of vehicles having bucket sets do incorporate center consoles of one style or another.

It will be appreciated that the direct mounting for phone P comprises plate section 22 and support plate section 25 by the cooperation of which a range of adjustability is provided. However, a single plate with thus a constant, fixed area may be substituted for the two cooperating sections without departing from the character of the present invention.

What is claimed is:

1. For use in a vehicle having first and second discrete front seats with there being a spacing between the same, said spacing having a floor, a mobile phone mounting comprising linkage means, bracket forming means secured to said vehicle floor within said spacing, means securing the lowermost end portion of said linkage means to said bracket means for projection of the upper or opposite end portion of said linkage means in upwardly spaced, forwardly directed relationship to said spacing floor, an arm, carried by said linkage means, for disposition within the upper portion of said spacing, adjustable means engaging the upper portion of said linkage means to said arm for providing a selected angular relationship of said arm relative to said floor, support plate means carried by said arm, hinge means for hingedly securing said support plate means to said arm for movement of said support plate means between substantially horizontal, operative position and substantially vertical, inoperative position, and means engaging a mobile phone upon said support plate means for movement therewith.

2. The invention as defined in claim 1 wherein the bracket means constitutes an L-shaped bracket having a horizontal leg and a vertical leg, means securing said horizontal leg to said spacing floor.

3. The invention as defined in claim 2 and further characterized by said adjustable means securing the lowermost end portion of said linkage means to said bracket comprising bolt means for adjustably clamping said linkage means to said bracket with selected angular relationship between said linkage means and said floor.

4. The invention defined in claim 1 wherein said support plate means comprises first and second plate members defined in contiguous planar parallel relationship and being adapted for relative movement for adjustability of the combined effective area thereof, and means for maintaining said first and second plate members in selected relationship.

5. The invention defined in claim 4 wherein said first plate member having at least one elongated slotlike opening having an axis perpendicular to the longitudinal axis of the said spacing when said support plate means are in operative position, and said maintaining means being a fastener projecting through said opening for movement therealong.

6. The invention defined in claim 1 wherein latching means reliably retain said support plate means in operative disposition.

7. The invention defined in claim 1 wherein a first latching element is mounted on said arm, a second latching element is carried on the normally underface of said support plate means for locking interengagement with said first latching element when said support plate means are in operative disposition.

8. The invention as defined in claim 1 wherein said linkage means comprises a plurality of elongated links, and means for adjustably interconnecting said links in mutually engaged, axially aligned relationship to provide a predetermined overall length to present the support plate means at a preselected height.

9. The invention as defined in claim 1 wherein the arm is presented in axial parallel relation to the longitudinal axis of said spacing and having a rearward portion and a forward portion, said linkage being engaged to the rearward portion of said arm.

10. The invention as defined in claim 9 wherein said arm is provided with a flange along the upper edge thereof, said hinge means comprising a hinge having a first component secured to said arm downwardly of said flange and a second component secured to said flange whereby the latter serves to limit swinging of said second hinge component when said hinge is in inoperative condition, and said support plate means are connected to said second hinge component for movement therewith.

11. The invention as defined in claim 10 wherein said support plate means is integral with said second hinge components and in planar perpendicular relationship thereto.

12. The invention as defined in claim 10 wherein resilient means engaging said hinge components for urging same into open state for presenting said support plate means in inoperative disposition, and latching means for maintaining said hinge components in closed state.

13. The invention as defined in claim 12 wherein said latching means comprises a first latch element carried on said arm normally downwardly of said first hinge component, and a second latch element carried on said support plate means proximate said second hinge component.

14. For use in a vehicle having first and second discrete front seats with there being a spacing between the same, said spacing having a floor, a mobile phone mounting comprising linkage means, the combination with a pair of first and second spaced-apart L-shaped brackets, each of said brackets having a horizontal leg and a vertical leg of said first bracket, a brace engaged to the vertical leg of said second bracket in one end portion of said brace to said linkage means, the said linkage means projecting upwardly and forwardly for the presentation of the upper or opposite end portion thereof in elevated relation to said spacing floor, an arm located upwardly of said spacing floor, adjustable means securing the upper portion of said linkage means to said arm for providing a selected angular relationship of said arm relative to said floor, said arm carrying a support plate means, and hinge means securing said support plate means to said arm for permitting rotation of said support plate for movement of said support plate means between substantially horizontal, operative position and substantially vertical, inoperative position, and means engaging a mobile phone upon said support plate means for movement therewith, said support plate means comprising first and second plate members defined in contiguous planar parallel relationship and being adapted for relative movement for adjustability of the combined effective area thereof, and means for maintaining said first and second plate members in selected relationship.

15. The invention as defined in claim 14 and further characterized by said adjustable means securing the upper portion of said linkage means to said arm comprising bolt means adjustably clamping a rearward extremity of said arm to a forward, upper extremity of said linkage means.

16. The invention as defined in claim 15 wherein said linkage means comprises a plurality of elongated link members and means for adjustably interconnecting said elongated link members in mutually engaged, axially aligned relationship to provide a predetermined selected overall length of the linkage means to present the support plate means at a preselected height.

* * * * *